Aug. 20, 1929.  M. KIES  1,725,197
EDUCATIONAL GAME
Filed June 29, 1927   2 Sheets-Sheet 1

| 15 | Alaska | | | | | 15 | Mexico |
| 05 | Angola | | | | | 15 | Persia |
| 20 | Antarctic | | | | | 15 | Philippine Islands |
| 10 | Arabia | 25 | British Isles | 20 | Greenland | 25 | Russia |
| 25 | Argentina | 25 | Canada | 15 | Hawaii | 10 | Samoa |
| 25 | Australia | 20 | Egypt | 05 | Iceland | 20 | Siberia |
| 10 | Bolivia | 10 | Fiji Islands | 20 | India | 20 | Spain |
| 10 | Borneo | 20 | France | 20 | Japan | 10 | Union of S. Africa |
| 25 | Brazil | 25 | Germany | 05 | Madagascar | 25 | United States |

Inventor
M. KIES
By Earl M. Sinclair
Attorney

Aug. 20, 1929.  M. KIES  1,725,197
EDUCATIONAL GAME
Filed June 29, 1927  2 Sheets-Sheet 2

| No. | Points (Pop by Thousands) | City | No. | Points (pop. by Thousands) | City |
|---|---|---|---|---|---|
| 1 | 5,620 | New York | 9 | 732 | Bronx |
| 2 | 2,702 | Chicago | 10 | 588 | Pittsburgh |
| 3 | 2,284 | Manhattan | 11 | 577 | Los Angeles |
| 4 | 2,018 | Brooklyn | 12 | 507 | Buffalo |
| 5 | 1,824 | Philadelphia | 13 | 457 | Milwaukee |
| 6 | 994 | Detroit | 14 | 438 | Washington D.C. |
| 7 | 797 | Cleveland | 15 | 415 | Newark |
| 8 | 773 | St. Louis | 16 | 324 | Kansas City |

Inventor
M Kies
By
Earl M. Sinclair
Attorney

Patented Aug. 20, 1929.

1,725,197

UNITED STATES PATENT OFFICE.

MATHIAS KIES, OF DUBUQUE, IOWA.

EDUCATIONAL GAME.

Application filed June 29, 1927. Serial No. 202,245.

The principal object of this invention is to provide a new and novel game which is instructive and entertaining.

More specifically the object of this invention is to provide a manually operated educational game comprising a map having places thereon given count values relative to their importance one to the other, a bar rotatably mounted above the map, and an adjustably and slidably mounted pointer on the bar.

A still further object is to provide an educational map game of chance that will give the players a conception of the relative importance of various places.

A still further object is to provide an educational game of chance that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

The easiest way to acquire knowledge along a certain line is to play a game featuring that knowledge. With this fact in mind, I have provided a game that may readily be adapted to the teaching of either important geographical, historical, or political places on a map.

Figure 1:
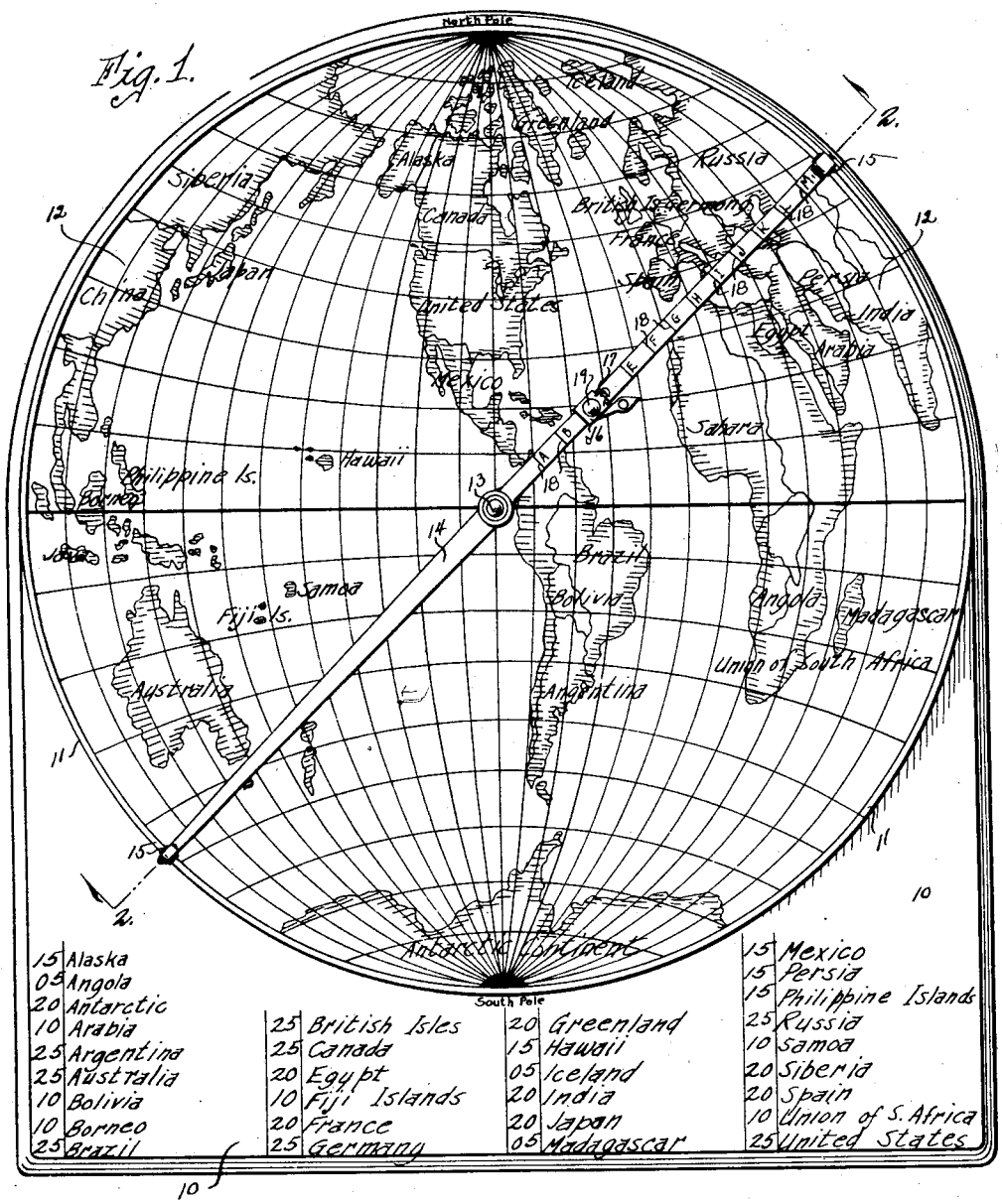
Fig. 1 is a top plan view of my complete device ready for use with chart showing the relative values of the various places on the map.
Figure 2:
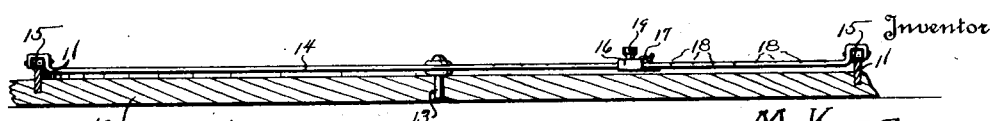
Fig. 2 is a side sectional view of my device and is taken on line 2—2 of Fig. 1.

I have used the numeral 10 to designate the base board of my device. Mounted in the upper portion and on the face of the board 10 is the circular endless track 11. Inside this track and on the face of the board 10 may be painted any desired map 12. In Fig. 1, I show the map of the world. Mounted in the center of the map 12 and in the board 10 is the spindle 13. Rotatably mounted on this spindle at a point near its center is the bar 14. Rotatably mounted on each end of the bar 14 is a roller 15 engaging the track 11 as shown in Fig. 2. Slidably mounted on the bar 14 is the pointer 16 having the spring catch 17 designed to frictionally engage any one of the notches 18 formed in the top surface of the bar 14. To facilitate the manual spinning of the bar 14 and the sliding of the pointer 16 I have provided the handle member 19.

The game is played by two or more persons who will spin the bar alternately after having adjusted the pointer according to his own desire in an attempt to have it stop at a point of relatively high valuation. These various valuations may be marked on the map, but I prefer to have a separate chart on the board as shown in Fig. 1. This promotes the memorizing of the valuations of the countries or places on the map. The value of the country or place on which the pointer stops counts for the one that spun the bar. After the predecided number of spins allowed each player has been made, the one having the highest score wins. Or if desired a certain score may be set and the one reaching that score first will win.

Figures 3, 4:
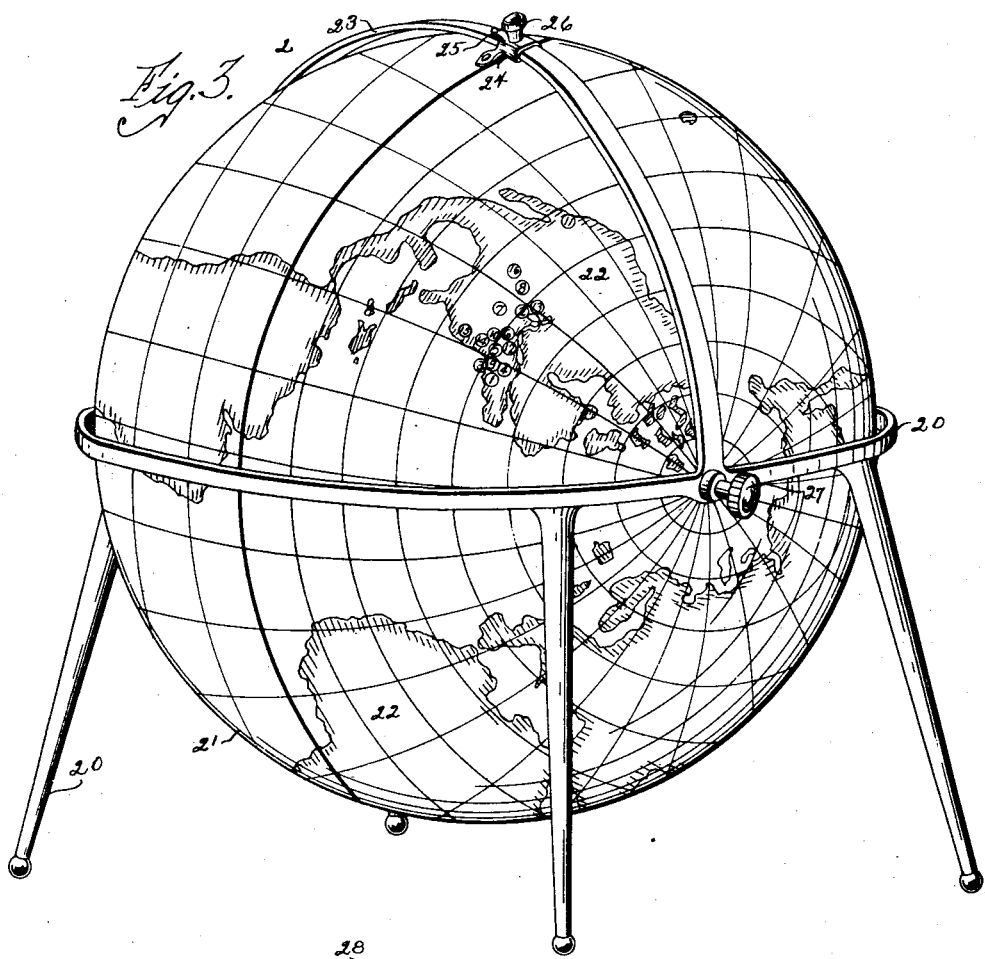
Fig. 3 is a perspective view of a modified form of structure of my educational game.
Fig. 4 is a suggested chart of values of various places that are rated in importance to their population.

In Fig. 3 I have shown a somewhat different construction. In this view I have designated the stand of the device by the numeral 20. Rotatably mounted on this stand is the sphere 21. On the surface of this sphere may be painted the map 22. In Fig. 3 I show the map of the world. Integrally formed on the stand and embracing the upper portion of the sphere is the bar 23. Slidably mounted on this bar is the pointer member 24 having the spring tongue 25 frictionally engaging the bar for yieldingly holding the pointer in any desired place on the bar. The numeral 26 designates a handle member to facilitate the sliding of the pointer on the bar. The numeral 27 designates a knob secured to the sphere for manually spinning the same on the stand 20. The structure shown in Fig. 3 differs from that shown in Fig. 1 in that the map itself is spun and the bar remains stationary, instead of the map remaining stationary and the bar being spun. When the construction shown in Fig. 3 is used a chart 28 should be made up. If it is desired to teach the population of the various cities this chart should contain the names of all the important large cities of the world and the value of each determined by allowing one point for each thousand of people.

The rules and the manner of playing the game is the same in both constructions.

The chart may be made up on any desired basis. For instance the basis of value may be determined by geographical, historical, or even industrial importance. The capitals of the nations should be given a high value. Famous battlefields, rivers, mountains, mining regions, or places where great personages were born may be given values, but in all cases the reason for so valuing a certain place should be apparent or else so noted on the chart so that the game would give beneficial knowledge to the players.

The map may be of the world, a nation, or even a city. The map of a city is especially instructive in teaching people of the places of interest of that city.

When small points on a large map are designated as having value, they should bear a numeral on the map as shown in Fig. 3, which corresponds to a similar number on the chart 28 which has the desired data and value relative to that place.

The player's skill depends in adjusting the pointer and spinning fast or slow so that the pointer will stop on places counting the most.

It will be appreciated by those familiar with the art that I have provided a game that will familiarize the players with geographical, historical, political, and industrial data in a most pleasurable way and without effort.

Some changes may be made in construction and arrangement of my device without departing from the real spirit and purpose of my invention and it is my intention to cover by my claims any modified forms of structure or use of mechanical equivalents which may be reasonably included within their scope.

I claim:

1. In a device of the class described, a base board, an endless circular track mounted on said board, a map on said board and inside said track having locations given values relative to their importance one to the other, a spindle mounted on said board and in the center of said map, a bar rotatably mounted on said spindle, a roller mounted on each end of said bar and in engagement with said track.

2. An educational game comprising a support, a map on said support, a bar extending across a portion of said map, supporting means for said bar permitting a relative rotary movement with respect to the map, rollers on said bar for engaging said support, a pointer slidably mounted on said bar, and a spring catch on said pointer arranged for frictional engagement with said bar, said map being provided with indicia adapted for selective indication by said pointer.

MATHIAS KIES.